(12) United States Patent
Gregg et al.

(10) Patent No.: US 6,877,047 B2
(45) Date of Patent: Apr. 5, 2005

(54) OPERATING A COUPLING CHANNEL IN A PLURALITY OF MODES

(75) Inventors: Thomas A. Gregg, Highland, NY (US); Kulwant M. Pandey, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 09/960,022

(22) Filed: Sep. 21, 2001

(65) Prior Publication Data

US 2003/0061416 A1 Mar. 27, 2003

(51) Int. Cl.[7] .............................................. G06F 13/00
(52) U.S. Cl. ............................. 710/33; 710/35; 710/62; 710/65
(58) Field of Search ............................. 710/33, 35, 62, 710/65

(56) References Cited

U.S. PATENT DOCUMENTS

| | | | |
|---|---|---|---|
| 5,319,754 A | * | 6/1994 | Meinecke et al. ............. 710/52 |
| 6,549,966 B1 | * | 4/2003 | Dickens et al. ............. 710/300 |
| 2001/0047441 A1 | * | 11/2001 | Robertson ..................... 710/65 |
| 2002/0144033 A1 | * | 10/2002 | Ragland ....................... 710/63 |
| 2003/0135681 A1 | * | 7/2003 | Laity et al. .................. 710/303 |
| 2003/0177294 A1 | * | 9/2003 | Russell ......................... 710/62 |

* cited by examiner

Primary Examiner—Kim Huynh
Assistant Examiner—Justin Knapp
(74) Attorney, Agent, or Firm—Lynn L. Augspurger

(57) ABSTRACT

A method and system for an I/O coupling channel to operate in a plurality of modes. The first mode is the new mode providing peer operation with many times more message passing facilities as the old mode. The second mode is used to connect the new channels through a converter to multiple old channels. In this mode, the new channel distributes its message passing resources among the multiple sink ports of the converter that are attached to old channels. The converter keeps no state information and only adjusts line speeds, routs outbound packets, and adds source information to inbound packets. The new channel operating in old compatibility mode gives the illusion to the software of multiple separate channels, one for each converter sink port.

9 Claims, 8 Drawing Sheets

Figure 8
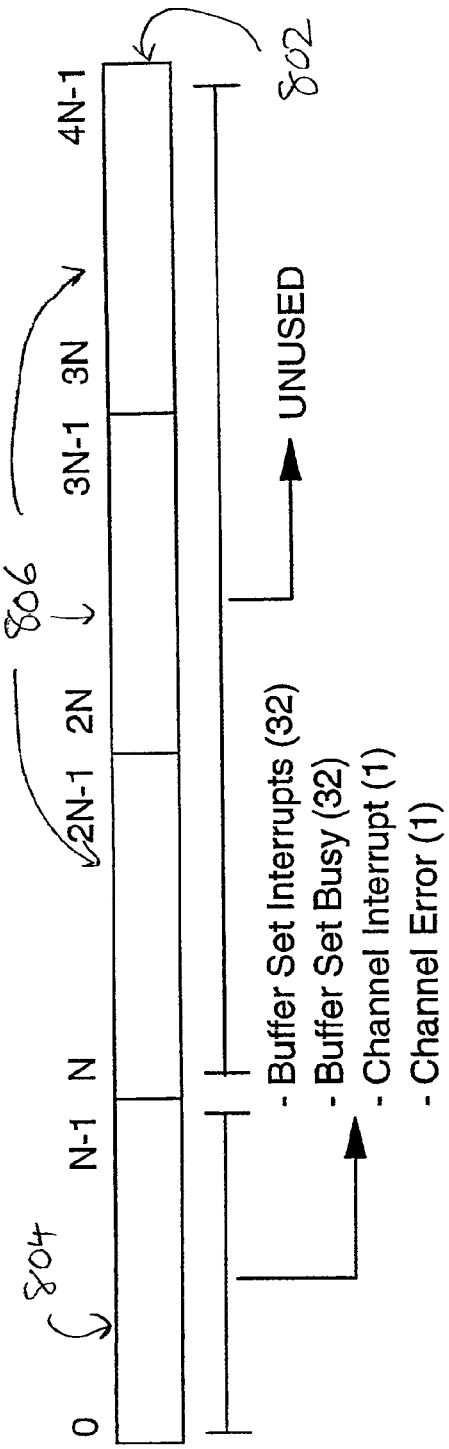
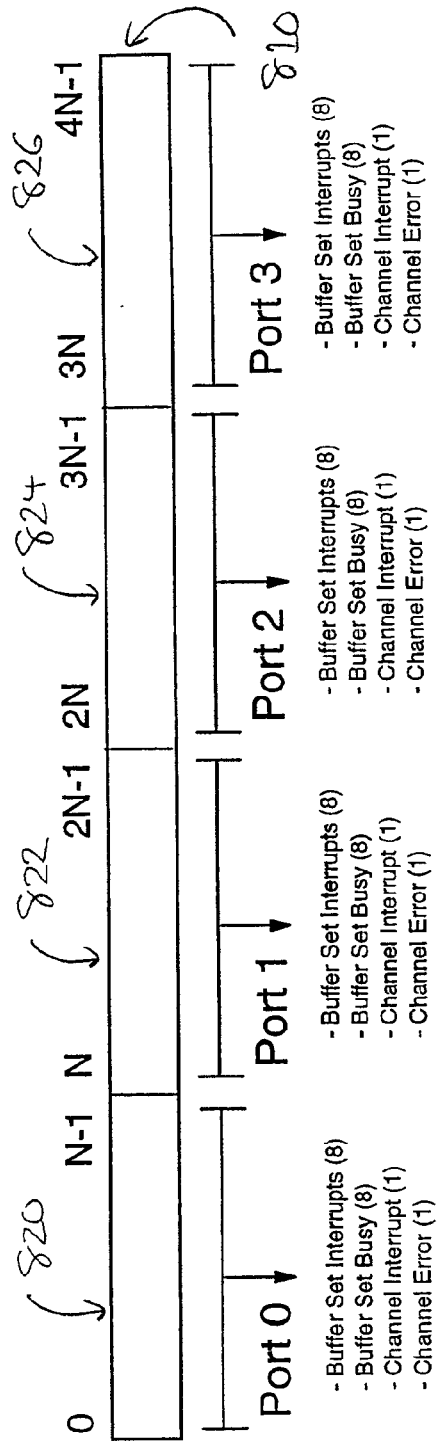

OPERATING A COUPLING CHANNEL IN A PLURALITY OF MODES

FIELD OF THE INVENTION

The present invention relates generally to communications between computer systems and, more particularly, the present invention is directed to supporting a method and apparatus to send messages between computer systems.

BACKGROUND

Many advances in computer technologies yield new Input/Output (I/O) channel interfaces with higher signaling speeds and more functions. As new I/O channel interfaces are introduced, they can obviously be used to interconnect identical new systems, but it is very desirable to connect some number of the previous system generation computers into the cluster. One solution is to provide a set of older I/O channel interfaces. Another solution is to provide new I/O channel interfaces that are capable of running in both the old and the new modes. However, this second approach may add considerable complexity in the line drivers and receivers of the channel interface. For example, clock extraction at multiple signaling speeds requires special circuits. An even more difficult problem is the operating voltages. The operating voltages of silicon circuitry continue to decrease as device geometries shrink. As a consequence, the I/O channel signaling voltages are also getting smaller. In fact, the newer I/O channel receiver circuits cannot tolerate the voltage swings of the older I/O channel driver circuits. This sometimes makes it impractical to have I/O channel driver and receiver circuits that can operate in multiple modes.

It is also known to add a converter that connects the new I/O channel interface to the old I/O channel interface. Such a converter includes at least one old I/O channel interface operating at its speed and voltage and at least one new I/O channel interface operating at its speed and voltage. Data buffering in the converter is required to handle the speed differences between the old and new I/O channel interfaces. Since the old I/O channel interface usually operates at a slower speed than the new I/O channel interface, it is desirable to have a converter that connects one of the new I/O channel interfaces to more than one of the old I/O channel interfaces. Depending on the complexity of the I/O channel interface protocol, the converter can quickly become far too complicated to be practical.

SUMMARY OF THE INVENTION

The preferred embodiment of the invention provides a new mode of operation providing more message facilities in a symmetrical, peer mode. Thus, for operating an I/O channel of a computer system, a plurality of modes are provided including a new high function mode operating as a new peer mode with respect to its attached channel at the opposite end of a link and an old compatibility mode operating through a converter to multiple sender and/or receiver channels connected at the opposite end of the converter sink ports. The preferred embodiment operates the channel when said new peer mode is directly connected to another identical channel operating in the same said new peer mode. More messages facilities are required to handle the increase in message traffic needed by the new system. Without more massage facilities, more I/O channel interfaces are required to handle a given amount of message traffic.

The preferred embodiment does provide a converter that converts from a single new I/O channel interface to a plurality of old channel interfaces. The complexity of the converter is minimized by exploiting the new functions of the new I/O channel to emulate a multiple of the old I/O channel interfaces. In particular, the increased number of message facilities in the new I/O channel are distributed over multiple old channel interfaces. Thus the converter only has to deal with the differences in signaling speeds and operating voltages and the routing of the message packets. The protocols of the I/O channel interfaces are not a concern to the converter design.

It is a further object of this invention to present a hardware interface to the software that gives the appearance of either a single I/O channel interface in the new mode or the appearance of multiple I/O channel interfaces in the old mode.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 illustrates the control vector formats in both new and old modes.

DETAILED DESCRIPTION OF THE PREFERRED EMBODIMENT

Figure 1:
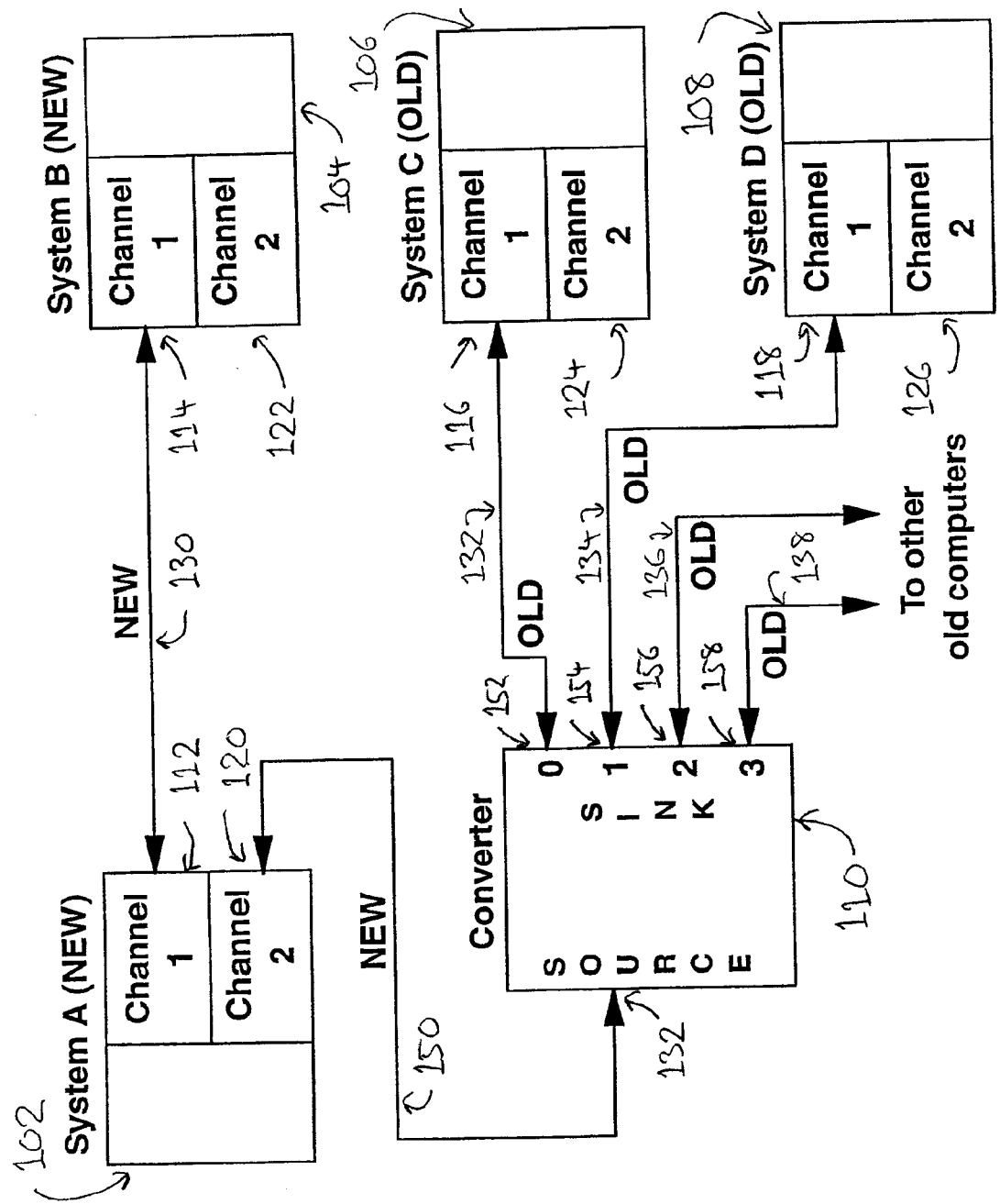
FIG. 1 illustrates a group of new and old systems interconnected by old and new I/O channel interfaces.

FIG. 1 shows computer System A 102, System B 104, System C 106, System D 108, and a converter 110. Each of the four systems has two I/O channel interfaces, channel 1 112, 114, 116, 118 and channel 2 120, 122, 124, 126. System A 102 and System B 104 are new and their channels 112, 114, 120, 122 operate at the new speed with the new functions. System C and System D are old and their channels 116, 118, 120, 122 operate at the old low speed with the old limited functions.

In FIG. 1 channel 1 112 in System A 102 is connected directly to channel 114 in System B 104 over link 130. Both of these channels operate in peer mode at the higher speed with the new functions. System A 102 is also connected to System C 106 and System D 108, but these connections require converter 110. Channel 2 120 in System A 102 is connected to the converter source port 150 over link 132. This channel operates in the old compatibility mode, but it still operates at the new higher speed with new functions to support compatibility mode. The converter 110 has four sink ports numbered 0 152, 1 154, 2 156, and 3 158. Port 0 152 is connected to channel 1 116 in System C 106 over link 132, port 1 154 is connected to channel 1 118 in System D 108 over link 134, and ports 2 156 and 3 158 are connected to other old systems (not shown) over links 136, 138. Channels 1 116, 118 in System C 106 and System D 108 operate at the old lower speed with the old limited functions.

Figure 2:
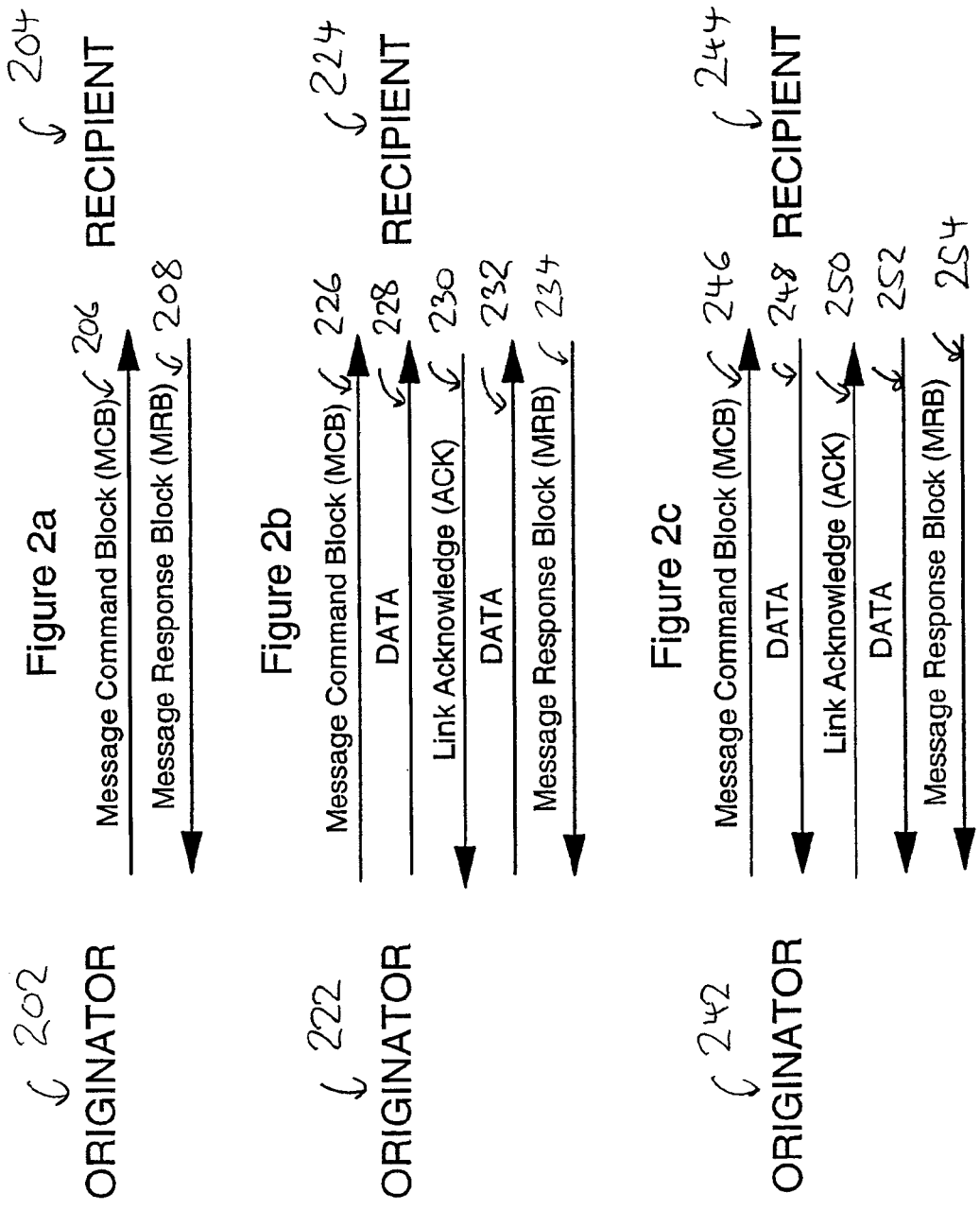
FIG. 2 (2a, 2b, 2c) illustrates the sequence of message exchanges over the link between two systems.

FIG. 2 shows the sequences of three different kinds of messages. FIG. 2a is the 'no data' case where the originator 202 sends a Message Command Block (MCB) 206 to the recipient 204. The recipient 204 responds with a Message Response Block (MRB) 208 sent back to the originator 202.

FIG. 2b is the write case where the originator 222 sends DATA to the recipient 224. Following the MCB 226, the originator 222 sends the first Data message area 228 to the recipient 224. If data area message buffer space is limited at the recipient, not all of the message data can be sent in one data area. Flow control is realized through the Link Acknowledge (ACK) 230 sent by the recipient back to the originator 222 when buffer space becomes available. The originator 222 responds by sending the next data area 232 to the recipient. It should be understood that this acknowledgment process can be repeated many times depending on the number of data areas transferred. After the last Data area 232 is received, the recipient 224 sends the MRB 234 back to the originator 222.

FIG. 2c is the read case where the originator 242 receives DATA from the recipient 244. Following the MCB 246, the recipient 244 sends the first Data area 248 back to the originator 24. If data area buffer space is limited at the originator, not all of the message data can be sent in one data area. Flow control is realized through the Link Acknowledge (ACK) 250 sent by the originator back to the recipient 244 when buffer space becomes available. The recipient 244 responds by sending the next data area 252 to the originator. It should be understood that this acknowledgment process can be repeated many times depending on the number of data areas transferred. After the last Data area 252 is sent, the recipient 244 sends the MRB 254 back to the originator 242.

Figure 3:
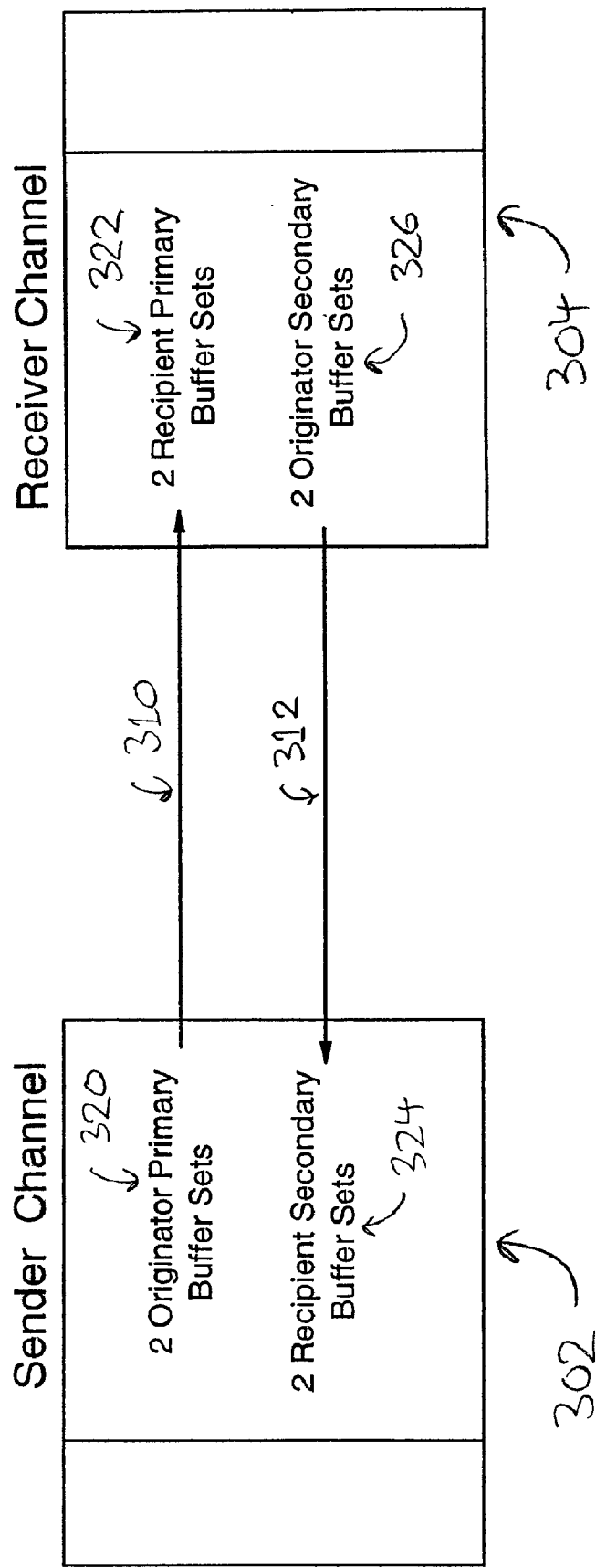
FIG. 3 illustrates the message passing facilities used by the old I/O channel.

FIG. 3 shows how message passing facilities are provided in old systems. System A 302 runs one or more Operating System (OS) images, and System B 304 runs a Coupling Facility (CF) image. Systems A and B are interconnected by an I/O channel link. The channel in System 1 302 is called a Sender Channel, and the channel is System B 304 is called a Receiver Channel. Each message exchange described in FIG. 2 requires a hardware facility called buffer set in each of the two systems' channels. When System A 302 sends a primary message to System B shown by arrow 310, it uses one of its two Originator Primary Buffer Sets 320; and when System B 304 receives a primary message from System A, it uses on of as its Recipient Primary Buffer Sets 322. Likewise, when System B 304 sends a secondary message to System A shown by arrow 312, it uses one of its two Originator Secondary Buffer Sets 326; and when System A 302 receives a primary message from System B, it uses one of its Recipient Secondary Buffer Sets 324. With two buffer sets of each type, two primary and two secondary messages may be in process (multiplexed) concurrently.

Figure 4:
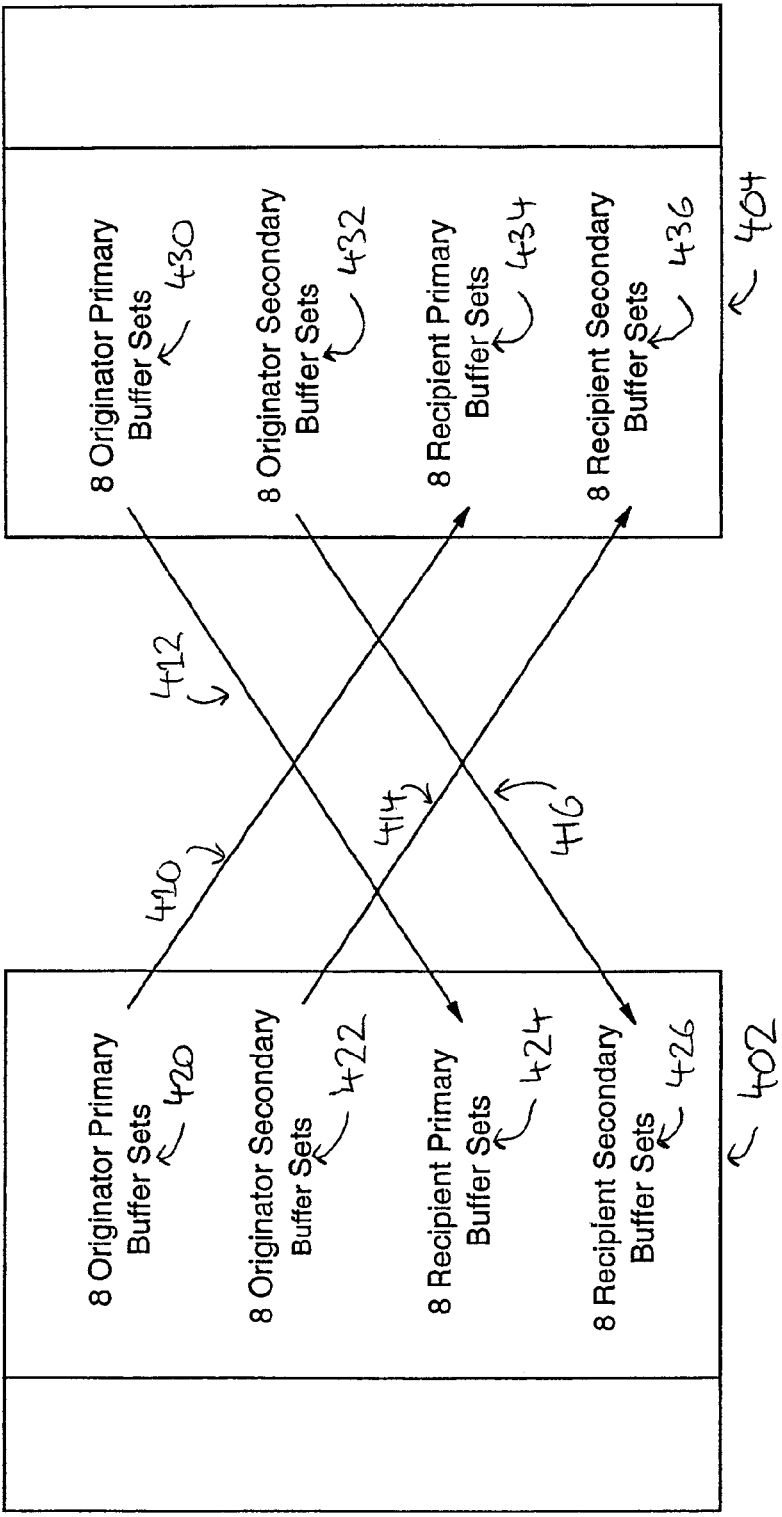
FIG. 4 illustrates the message passing facilities used by the new I/O channel in the new mode.

FIG. 4 shows how the number of buffer sets has been increased in the new systems' channels. In the new systems, both multiple OSs and a CF may share the same I/O channel, and these channels are called Peer Channels. In both System A 402 and System B 404, each I/O channel provides eight Originator Primary Buffer Sets 420, 430 and eight Recipient Secondary Buffer Sets 426, 436 for its OS images and eight Originator Secondary Buffer Sets 422, 432, and eight Recipient Primary Buffer Sets 424, 434 for its CF image. Arrow 410 shows primary messages sent by an OS image in System A 402 to the CF image in System B 404, arrow 412 shows primary messages sent by an OS image in System B 404 to the CF image in System A 402, arrow 414 shows secondary messages sent by the CF image in System A 402 to the OS images in System B 404, and arrow 416 shows secondary messages sent by the CF image in System B 404 to the OS images in System A 402.

Figure 5:
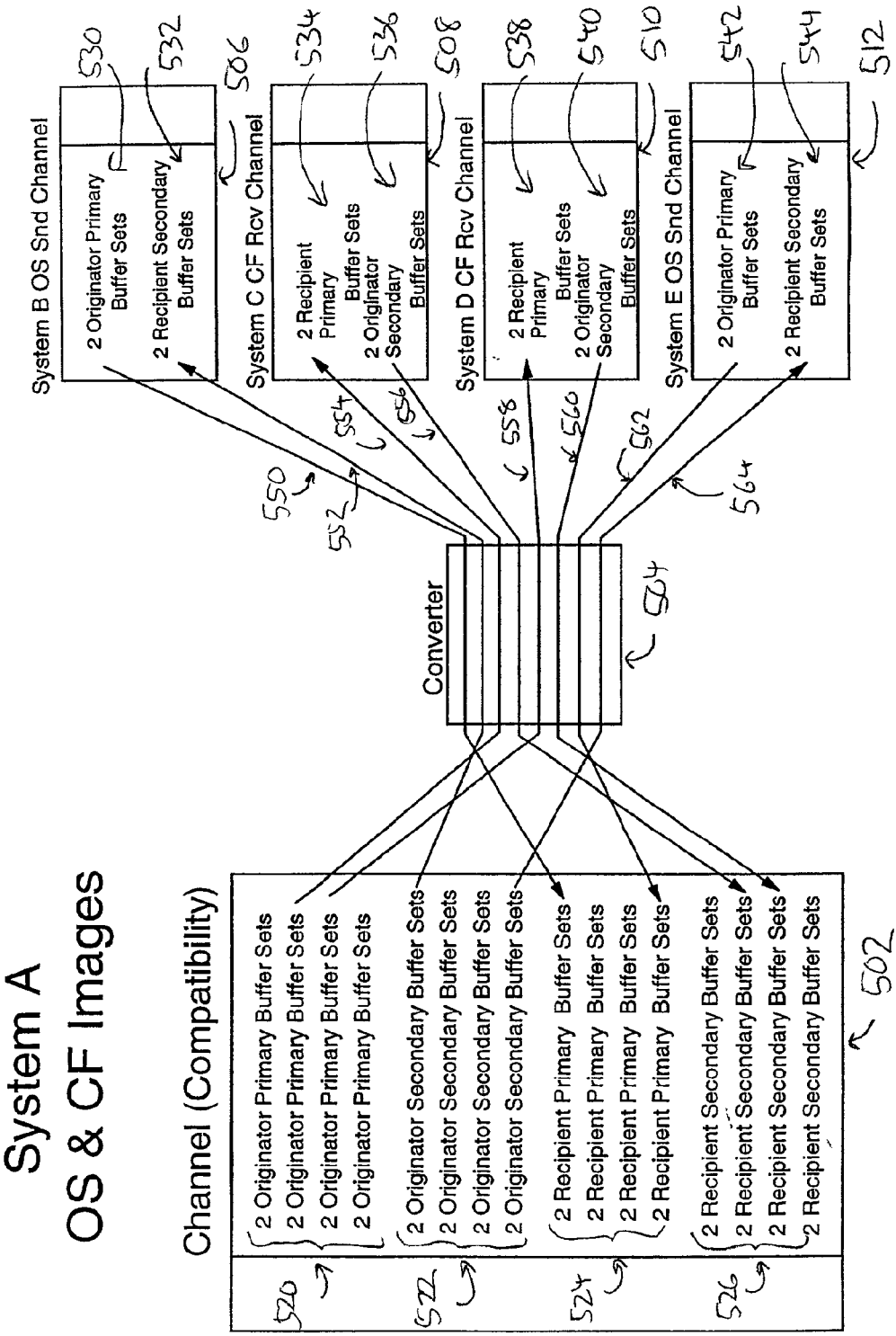
FIG. 5 illustrates the message passing facilities used by the new I/O channel when operating with old I/O channel interfaces through the converter.

FIG. 5 shows the new System A 502 I/O channel connected to converter 504 which then connects to four old systems, System B 506, System C 508, System D 510, and System E 512. The eight Originator Primary Buffer Sets 420 Of System A's 402 channel in FIG. 4 are configured as four pairs of Originator Primary Buffer Sets 520. Likewise, the eight Originator Primary Buffer Sets 422, Eight Recipient Primary Buffer Sets 424, and eight Recipient Secondary Buffer Sets 426 in FIG. 4 are configured as four pairs of Originator Secondary Buffer Sets 522, four pairs of Recipient Primary Buffer Sets 524, and four pairs of Recipient Secondary Buffer Sets 426, respectively.

Systems B 506, C 508, D 510, and E 512 channels operate in the old mode, and therefore must be owned by either OS images or a CF image. As shown in FIG. 3, the OS owned channels are called Sender Channels, and the CF owned channels are called Receiver Channels. Sender and Receiver Channels cannot be shared by both OS images and a CF image. In FIG. 5, System B's and E's channels 506, 512 are owned by OS images and therefore each channel has two Originator Primary Buffer Sets 530, 542 and two Recipient Secondary Buffer Sets 532, 544. System C's and D's 508, 510 channels are owned by CF images and therefore each channel has two Recipient Primary Buffer Sets 534, 538 and two Originator Secondary Buffer Sets 536, 540.

The arrows in FIG. 5 show how the message flow between buffer sets in the new and old systems' channels through the converter 504 and how the buffer sets are connected to each other. Arrow 550 shows primary messages sent from System B 506 to System A 502, arrow 552 shows secondary messages sent from System A 502 to System B 506, arrow 554 shows primary messages sent from System A 502 to System C 508, arrow 556 shows secondary messages sent from System C 508 to System A 502, arrow 558 shows primary messages sent from System A 502 to System D 510, arrow 560 shows secondary messages sent from System D 510 to System A 502, arrow 562 shows primary messages sent from System E 512 to System A 502, and arrow 564 shows secondary messages sent from System A 502 to System E 512.

Note in FIG. 5 that only half of the message facilities in System A's 502 channel are actually used when it is operating in the old mode with the converter 504. This allows any combination of connections to old systems' channels owned by any combination of OS and CF images. For example, all old systems could have channels owned by OSs (Sender Channels), all CFs (Receiver Channels), or any combination of OSs and CFs. In FIG. 5, two old systems' channels are owned by OSs (System B 506 and System E 512), and the other two old systems' channels are owned by CFs (System C 508 and System D 510).

Figure 6:
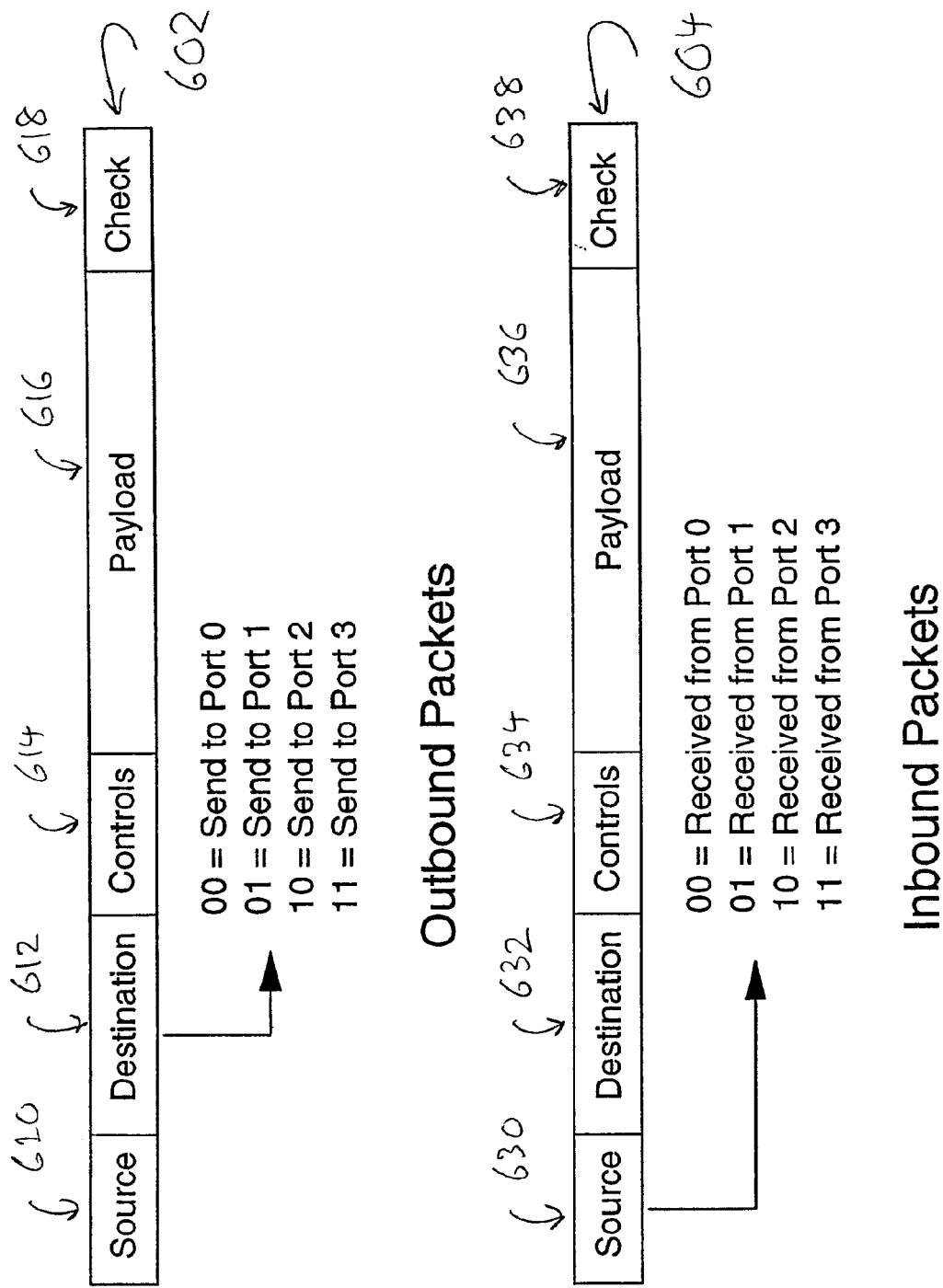
FIG. 6 illustrates the message packet source and destination fields used by the converter.

FIG. 6 shows the format of the packets used to exchange messages and describes the routing functions in the converter. Packets sent between two old systems and between two new systems have the same format as the packets shown in FIG. 6; however, the source fields 610, 630 and destination fields 612, 632 are not required because the channels are connected directly between the systems and there is no converter. The controls field 614, 634 includes information specifying the Buffer Set Number (0 or 1 for the old mode and 0 through 7 for the new mode), the Buffer Set type (primary or secondary message), and the buffer area (MCB, MRB, Data, or Link Acknowledgment). The payload field 616, 636 contains the message data, and the check field 618, 638 contains an error checking field. Each message area may be transmitted in a variable number of packets depending on the particular embodiment. In this one, packets have a 128 byte payload, and the message areas may be from zero to a million bytes or more.

Outbound packets 602 are sent from the new system through the converter to an old system. When an outbound packet 602 is received by the converter, it examines the destination field 612 to determine to which sink port the packet should be routed. For example, referring to FIG. 1, if the destination field 612 has a value of 10 binary (2 decimal), the packet is routed to converter sink port 2 156. As the packet flows through the converter, the converter sets the destination field 612 to zero because the old systems' channels do not use this field and do not expect it to have any value other than zero.

Inbound packets 604 are sent from an old system through the converter to the new system. When an inbound packet 604 is received by the converter, the converter replaces the source field 630 with the sink port number that received the packet, and the converter then sends the packet to the source port to the new system's channel. The old systems' channel does not use the source field, so it always sets this field to zero when generating inbound packets.

The new system's channel operating in the new mode sets the buffer set number and type in the controls field 614 in outbound packets based solely on the buffer set from which the packet originated. When receiving packets, the channel uses the buffer set number and type in the controls field 614, 634 to steer inbound packets to the correct buffer set. When the new system's channel is operating in old (compatibility) mode, is sets both the buffer set number and type in the controls field 614 and the destination field 612 in the outbound packets. The destination field 612 is set based on the buffer set pair that originates the packet. For example, if the packet is originated by the third pair, the channel sets the destination field 612 to 10 binary (2 decimal). The buffer set number in the controls field 614 is set based on which of the two buffer sets in the pair originated the packet, and it sets the type in the controls field 614 based on the type of buffer set that originated the packet (originator primary, originator secondary, recipient primary, or recipient secondary). When inbound packets are received, the channel examines both the controls field 634 and the source field 630 to determine to which buffer set the packet is to be directed. The source field 634 determines which pair of buffer sets to send the packet. For example, if the packet source number 630 is 10 binary (2 decimal), the packet is sent to the third pair of buffer sets. The buffer set number in the controls field 624 is used to select one of the two buffer sets of the pair, and the type in the controls field 634 is used to select the buffer set type (originator primary, originator secondary, recipient primary, or recipient secondary).

As described above, the converter's function is limited to the relatively simple task of routing the outbound packets and tagging the inbound packets. The complexity is contained in the new system's channel.

Figure 7:
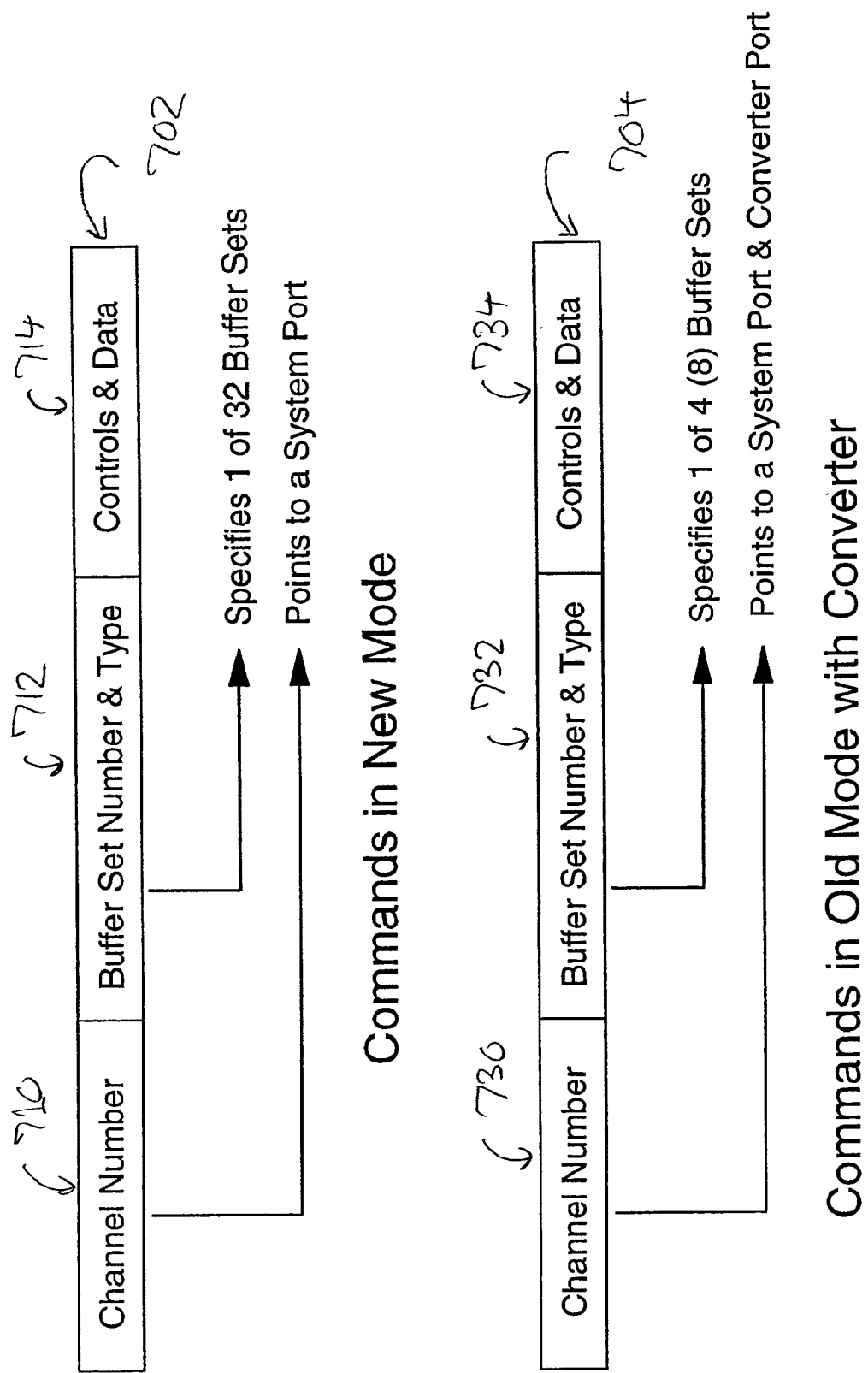
FIG. 7 illustrates the command format the software uses to control the I/O channels in both new and old modes.

FIG. 7 shows how the system software communicates with the new system's channel in both the new mode and the old (compatibility) mode. The commands 702, 704 sent to the channel are used to set control information into the channel and to retrieve state information from the channel. Commands in both the new and old modes include a Channel number 710, 730, a buffer set number and type 712, 732, and controls and data 714, 734. In the new mode, software sets the Channel number 710 to a value specifying the I/O channel port. Referring to FIG. 1, this value specifies either Channel 1 112 or Channel 2 114. No other information is conveyed in the Channel Number 710. The buffer set number in field 712 ranges from 0 to 7 and the type in field 712 specifies one of the four buffer set types (originator primary, originator secondary, recipient primary, or recipient secondary).

FIG. 7 also shows how the new system's channel operating in old (compatibility) mode gives software the illusion that it is communicating with multiple (four) separate channels. In the old mode, software sets the Channel number 730 to a value specifying not only the I/O channel port, but also the sink port on the converter. Referring to FIG. 1, this value specifies either Channel 1 112 or Channel 2 114 and one of the four converter sink ports 152, 154, 156, 158. The buffer set number in field 712 is either 0 or 1 and the type in field 712 specifies one of the four buffer set types (originator primary, originator secondary, recipient primary, or recipient secondary).

FIG. 8 shows the format of the various control vectors in the system's channel hardware. These control vectors have many functions including presenting interruptions to the system's processors. There is one or more interrupt bits for each buffer set. These bit(s) indicate conditions such as the completion of a message, intervention required by a processor, or an error in the buffer set. There is also one or more interrupt bits for the channel itself. Another control vector indicates various busy conditions such as a buffer set being busy or the channel interface being busy. Yet another set of control vector bits indicates error conditions in the channel hardware and on the channel interface.

In the new mode, the bits in these registers 802 are packed into the first N bits 804 of the registers (N is 64 bits in this embodiment). This packing allows efficient sensing by the software since the software can only load a maximum of 64 bits by a single command to the channel. Bits N through 4N−1 806 of these registers are unused.

In the old (compatibility) mode, the channel hardware gives an illusion to the software of multiple (four) separate channels. The control vector registers 810 are logically divided into four areas 820, 822, 824, 826, each with N bits. All activity pertaining to converter port 0 is indicated in the first N bits 820. This activity includes the buffer set interruptions, buffer set busy conditions, converter sink port error conditions, and any errors that can be isolated to a single port. More global errors that cannot be isolated set error bits in all four areas of the appropriate control register.

In the new mode connecting two new systems and in the old mode connecting two old systems, each packet has a sequence number. In these modes, each end of the link keeps track of its transmit packet sequence number and its receive packet sequence number. The transmit packet sequence number is simply incremented by one for each successive packet. The receive packet sequence number is compared to the sequence number in each received packet. Once a packet is received with the a correctly matching sequence number, the receive packet sequence number is incremented by one in preparation of the receipt of the next packet. If the packet sequence number in a received packet does not match, the appropriate recovery action is takes by the software.

In the old (compatibility) mode, multiple packet sequence numbers are required to give the illusion of having multiple channels, and the new system's channel has one pair for each converter port it supports (four). The converter neither examines nor generates these packet sequence numbers.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for operating an I/O coupling channel of a computer system, comprising the steps of:

providing a plurality of modes for said coupling channel having a first new high function mode and a second old compatibility mode for intersystem coupling of computer systems which is addapted to be used with a collection of computer systems some of which have new high function mode channels and other of which computer systems which have old compatability mode channels, wherein is included:

said first new high function mode for said coupling channel and enabling said first new function mode for operating as a new peer mode with respect to its attached channel at the opposite end of a link; and said second old compatibility mode for said coupling channel and enabling said second old compatibility mode operating through a converter having multiple sink ports to multiple sender and/or receiver channels connected at the opposite end of the converter's multiple sink ports, and then operating said coupling channel when said new peer mode is directly connected to another identical channel operating in the same said new peer mode, and providing when said first high function mode is operating the first high function mode a peer operation with many times more message passing facilities than said second old compatibility mode.

2. The method as recited in claim 1, wherein said coupling channel operating in the new peer mode uses all of its message passing resources to exchange the maximum number of messages concurrently.

3. The method as recited in claim 2, wherein when required, said coupling channel operates in said second old compatibility mode and said coupling channel is attached to a converter that allows further attachment of said coupling channel to a plurality of older systems' channels and said second mode old compatability mode is used to connect the first high function mode channels through said converter to multiple second oll compatibility mode channels.

4. The method as recited in claim 3, wherein when said coupling channel is operating in said second old compatibility mode said coupling channel divides its message passing resources among said multiple sink ports of said converter.

5. The method as recited in claim 4, wherein said converter comprises the functions:

keeps no state information;

adjusts differences in line speeds between a source and said multiple sink ports;

routes outbound packets to the correct sink port; and adds source information to inbound packets.

6. The method as recited in claim 1, wherein when said coupling channel is operating in said second old compatibility mode said coupling channel appears to coupling software controlling transmissions over said coupling channel as a plurality of independent channels operating in said second old compatibility mode.

7. The method as recited in claim 6, wherein when said coupling channel is operating in said second old compatibility mode said converter converts from a new coupling channel interface by processing commands from said coupling software giving the illusion of multiple separate old channels while said converter keeps no state information and only adjusts line speeds, routes outbound packets, and adds source information to inbound packets.

8. The method as recited in claim 7, wherein when said coupling channel is operating in said second old compatibility mode said coupling channel presents interruption, busy, state, and error information to the coupling software while giving the illusion of having a plurality of separate channels operating in said second old compatibility mode.

9. The method as recited in claim 8, wherein while said coupling channel operating in said second old compatibility mode said coupling channel provides a plurality of independent sequence numbers, one pair for each of said multiple sink ports.

* * * * *